United States Patent
Farning et al.

(10) Patent No.: US 8,383,564 B2
(45) Date of Patent: *Feb. 26, 2013

(54) HETEROCOAGULATE, AND COMPOSITIONS AND METHOD FOR POLISHING AND SURFACE TREATMENT

(75) Inventors: Abigail R. Farning, Braidwood, IL (US); Harry W. Sarkas, Plainfield, IL (US); Patrick G. Murray, Yorkville, IL (US)

(73) Assignee: Nanophase Technologies Corporation, Romeoville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,314

(22) Filed: Sep. 19, 2011

(65) Prior Publication Data

US 2012/0094578 A1  Apr. 19, 2012

Related U.S. Application Data

(63) Continuation of application No. 12/695,047, filed on Jan. 27, 2010, now Pat. No. 8,022,025.

(51) Int. Cl.
C09K 3/14 (2006.01)

(52) U.S. Cl. ........... 510/180; 216/88; 252/79.1; 451/41; 51/309

(58) Field of Classification Search ............. 510/180; 252/79.1; 216/88; 451/41; 51/309
See application file for complete search history.

(56) References Cited

U.S. PATENT DOCUMENTS

| | | |
|---|---|---|
| 2,383,500 A | 8/1945 | Polan et al. |
| 2,597,182 A | 5/1952 | Rickner et al. |
| 2,682,460 A | 6/1954 | Carper |
| 2,816,824 A | 12/1957 | Wilansky et al. |
| 2,830,884 A | 4/1958 | Smiley |
| 3,080,224 A | 3/1963 | Swift et al. |
| 3,425,870 A | 2/1969 | Marsh et al. |
| 3,573,886 A | 4/1971 | Goetzinger et al. |
| 3,768,989 A | 10/1973 | Goetzinger et al. |
| 3,934,988 A | 1/1976 | Barfield |
| 4,102,706 A | 7/1978 | Thomas |
| 4,574,063 A | 3/1986 | Scherer |
| 5,382,272 A | 1/1995 | Cook et al. |
| 5,480,476 A | 1/1996 | Cook et al. |
| 5,707,740 A | 1/1998 | Goodwin |
| 5,980,990 A | 11/1999 | Goodwin |
| 6,025,025 A | 2/2000 | Bartrug et al. |
| 6,582,761 B1 | 6/2003 | Nishimoto et al. |
| 6,896,590 B2 | 5/2005 | Minamihaba et al. |
| 7,056,192 B2 * | 6/2006 | Venigalla et al. ............ 451/36 |
| 7,097,677 B2 | 8/2006 | Yokoi |
| 7,368,388 B2 * | 5/2008 | Small et al. ............ 438/692 |

(Continued)

FOREIGN PATENT DOCUMENTS

JP 01014129 1/1989

OTHER PUBLICATIONS

Material Safety Data Sheet, Citric Acid, https//www.jtbaker.com/msds/englishhtml/c4730.htm, pp. 1-4, printed on Jun. 25, 2009.

(Continued)

*Primary Examiner* — Gregory Webb
(74) *Attorney, Agent, or Firm* — Evan Law Group LLC

(57) ABSTRACT

A heterocoagulate comprises first particles, having a particle size of at most 999 nm, on a second particle, having a particle size of at least 3 microns. The first particles comprise cerium oxide, and second particle comprises at least one member selected from the group consisting of silicon oxides, aluminum oxides and zirconium oxides.

21 Claims, 2 Drawing Sheets

U.S. PATENT DOCUMENTS

| | | | |
|---|---|---|---|
| 7,517,513 | B2 | 4/2009 | Sarkas et al. |
| 8,022,025 | B1 * | 9/2011 | Farning et al. ............ 510/180 |
| 2003/0091647 | A1 | 5/2003 | Lewis et al. |
| 2006/0057943 | A1 | 3/2006 | Venigalla et al. |
| 2006/0108326 | A1 | 5/2006 | Dysard et al. |
| 2009/0075093 | A1 | 3/2009 | Iversen et al. |
| 2009/0137124 | A1 | 5/2009 | Carter et al. |
| 2012/0094578 | A1 * | 4/2012 | Farning et al. ............ 451/28 |

OTHER PUBLICATIONS

Material Safety Data Sheet, Dowanol® DPM Glycol Ether The Dow Chemical Company, pp. 1-8, (2007).
Material Safety Data Sheet, Glycolic acid, 67% in water, https//fscimage.fischersci.com/msds/80612.htm, pp. 1-6, printed on Aug. 14, 2009.
Material Safety Data Sheet, Hess Super Grade Pumice, Hess Pumice Products, Inc., 2 pages, (2007).
Material Safety Data Sheet, NanoArc® Cerium Oxide, Nanophase Technologies Corporation, 3 pages, (2006).
Material Safety Data Sheet, NanoTek® CE-6040, Nanophase Technologies Corporation, 3 pages, (2008).
Material Safety Data Sheet, Oxalic Acid, anhydrous, p.a., https//fscimage.fischersci.com/msds/97194.htm, pp. 1-6, printed on Aug. 12, 2009.
Material Safety Data Sheet, Sodium dodecyl sulphate, Sigma Aldrich Corporation, pp. 1-6, (2008).
Material Safety Data Sheet, SZ 23681, J. & E. Sozio Inc., pp. 1-2, (2009).
Material Safety Data Sheet, TEGO® FOAMEX 3062, Evonik Industries, 8 pages, (2007).
Material Safety Data Sheet, TEGO® FOAMEX 843, Evonik Industries, 8 pages, (2009).
Murray, P.G., "Nanocrystalline Cerium Oxide Improves Glass Polishing Operations", Photonics Spectra, 2 pages, reprint of Aug. (2004).
Product Brochure, Celexis™ Slurry for Direct STI, ROHM and HAAS Electronic Materials CMP Technologies, 2 pages, (2004).
Product Brochure, Laponite® Rockwood Additives Limited, pp. 1-24, (2008).
Product Data Sheet, BYK 420, BYK Additives & Instruments, 2 pages, (2009).
Product Data Sheet, KELTROL® T 630 Xanthan Gum, CP Kelco A Huber Company, pp. 1-3, (2009).
Product Data Sheet, TEGO® FOAMEX 1488, Evonik Tego Chemie GmbH, 1 page, (2010).
Product Data Sheet, TEGO® FOAMEX 1495, Evonik Tego Chemie GmbH, 1 page, (2010).
Product Data Sheet, TEGO® FOAMEX 7447, Evonik Tego Chemie GmbH, 1 page, (2010).
Product Data Sheet, TEGO® FOAMEX 800, Evonik Tego Chemie GmbH, 1 page, (2010).
Product Data Sheet, TEGO® FOAMEX 8030, Evonik Tego Chemie GmbH, 1 page, (2010).
Product Data Sheet, TEGO® FOAMEX 805, Evonik Tego Chemie GmbH, 1 page, (2010).
Product Data Sheet, TEGO® FOAMEX 810, Evonik Tego Chemie GmbH, 1 page, (2010).
Product Data Sheet, TEGO® FOAMEX 822, Evonik Tego Chemie GmbH, 1 page, (2010).
Product Data Sheet, TEGO® FOAMEX 825, Evonik Tego Chemie GmbH, 1 page, (2010).
Product Data Sheet, TEGO® FOAMEX 830, Evonik Tego Chemie GmbH, 1 page, (2010).
Product Data Sheet, TEGO® FOAMEX 832, Evonik Tego Chemie GmbH, 1 page, (2010).
Product Data Sheet, TEGO® FOAMEX 835, Evonik Tego Chemie GmbH, 1 page, (2010).
Product Data Sheet, TEGO® FOAMEX 840, Evonik Tego Chemie GmbH, 1 page, (2010).
Product Data Sheet, TEGO® FOAMEX 842, Evonik Tego Chemie GmbH, 1 page, (2010).
Product Data Sheet, TEGO® FOAMEX 855, Evonik Tego Chemie GmbH, 1 page, (2010).
Product Information Sheet, Dowanol® DPM Dipropylene Glycol Methyl Ether, The Dow Chemical Company, pp. 1-2, (2004).
Safety Data Sheet, Laponite® B, Rockwood Additives Limited, pp. 1-5, (2008).
Safety Data Sheet, Laponite® RD, Rockwood Additives Limited, pp. 1-5, (2008).
Material Safety Data Sheet, Optiflo® H400, Rockwood Additives, 5 pages, (2008).
Material Safety Data Sheet, Optiflo® H500, Rockwood Additives, 5 pages, (2008).
Material Safety Data Sheet, Optiflo® H600, Rockwood Additives, 5 pages, (2008).
Material Safety Data Sheet, Optiflo® HV80, Rockwood Additives, 4 pages, (2008).
Material Safety Data Sheet, Optigel® CG, Rockwood Additives, 2 pages, printed on Apr. 29, 2010.
Material Safety Data Sheet, Optigel® WH, Rockwood Additives, 6 pages, (2010).
Material Safety Data Sheet, Optigel® WX, Rockwood Additives, 5 pages, (2008).
Product Data Sheet, TEGO® FOAMEX 843, Evonik Tego Chemie GmbH, 1 page, (2010).
Product Data Sheet, Bindzil® SM/ Bindzil® CC, AkzoNobel Pulp and Paper Chemicals/Eka Chemicals, Inc., 2 pages, (2008).
Summary of JP01014129, Issued Jan. 18, 1989, found at Scifinder, American Chemical Society, (2010).

* cited by examiner

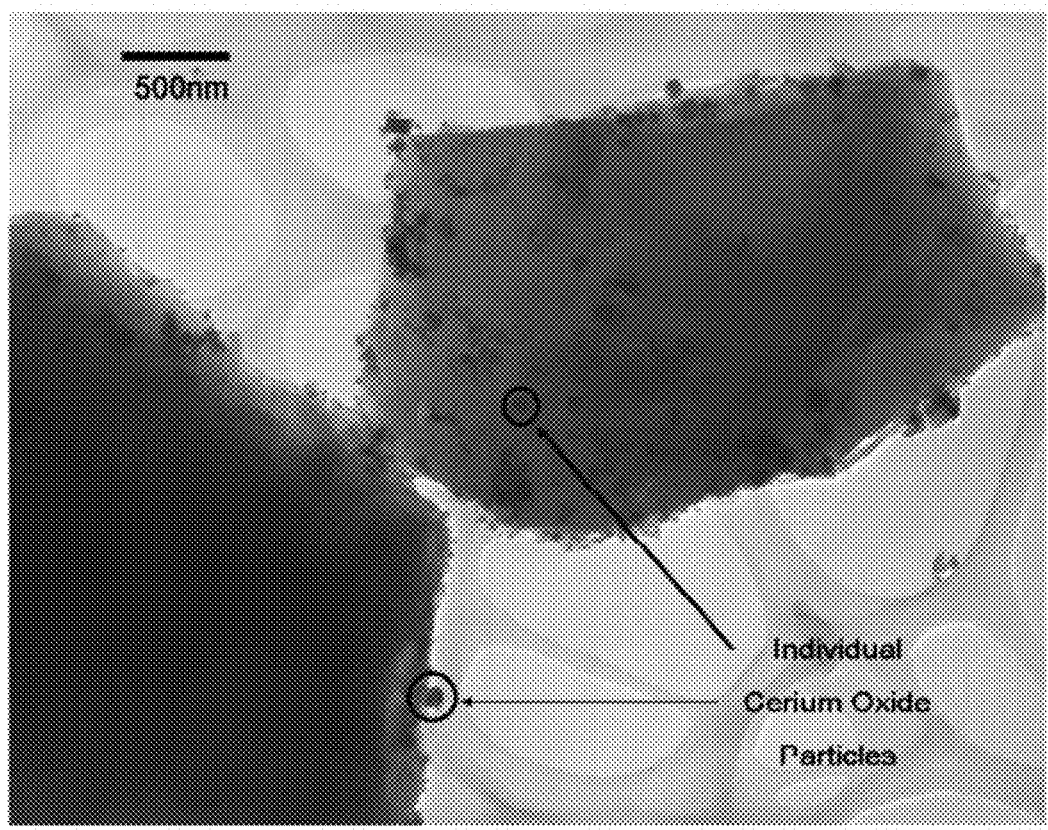

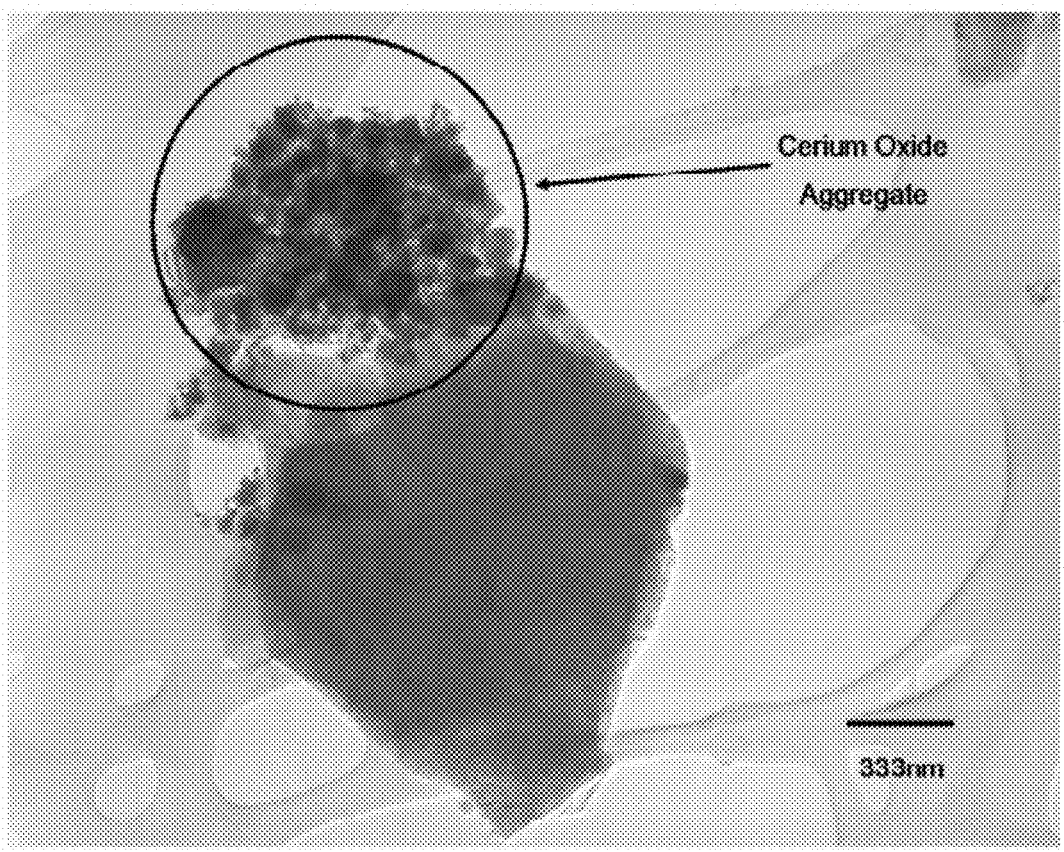

HETEROCOAGULATE, AND COMPOSITIONS AND METHOD FOR POLISHING AND SURFACE TREATMENT

CROSS REFERENCE TO RELATED APPLICATION

This application is a continuation application of U.S. application Ser. No. 12/695,047 (now U.S. Pat. No. 8,022,025), filed Jan. 27, 2010, entitled "HETEROCOAGULATE, AND COMPOSITIONS AND METHOD FOR POLISHING AND SURFACE TREATMENT".

BACKGROUND

The polishing of glass using cerium oxide (ceria) is well established and has a long history of use (see, for example, U.S. Pat. No. 2,383,500 and U.S. Pat. No. 2,816,824). Not only has ceria been used to shape glass into lenses, but it can also be used to polish the surface of the glass to chemically prepare it for the application of surface treatments (see, for example, Bartrug et al., U.S. Pat. No. 6,025,025 and Iversen et al., Patent Application Publication Pub. No. US 2009/0075093). In addition, ceria has been used to polish a variety of other silicon oxide surfaces both chemically and mechanically, for example photomask blanks, lithography optics and silicon wafers.

For final stage polishing applications, available ceria slurries typically have particle sizes small enough that they do not produce visible scratches. Particularly for high-performance applications, the particles are dispersed down to their primary size, do not contain higher-order agglomerates, and the dispersion of particles are stable (see, for example, P. G. Murray, "Nanocrystalline Cerium Oxide Improves Glass Polishing Operations" *Photonics Spectra*, August 2004). Examples of such high-performance ceria slurries include cerium oxide dispersions of NanoArc® Cerium Oxide nanopowder (Nanophase Technologies Corporation, Romeoville, Ill.; crystalline, non-porous, non-agglomerated particles having a mean particle size of 30 nm), such as NanoTek® CE-6040. The particles in the dispersion have a high zeta potential of 35-45 mV in the pH range of 3-4, and they form stable dispersions in water without additives (see, for example, Sarkas et al., U.S. Pat. No. 7,517,513).

Hydrophilic surface treatment of glass and other hard surfaces using silica sols is well established (see, for example, JP 01014129, issued 8 Jun. 1987, and Bindzil® CC product Brochure published by Eka/Akzo Nobel, April 2008). Not wishing to be bound by any particular theory, silica particles are present in a basic solution containing a volatile base, such as ammonia; as water, solvent and/or base evaporates, the silica particles coalesce and form a fully hydrated silicon oxide surface. The surface is very hydrophilic, and may be self-cleaning with ambient water, such as rain, which wets the surface and may remove dust and dirt. The use of silica and silicate hydrophilic surface treatments is advantageous in that no photoactivation is required in order achieve a hydrophilic effect, in contrast to analogous treatments based on titanium dioxide or titanium-substituted hydroxyapatite. In addition, a high degree of optical clarity is readily achieved using either silica or silicates, since these materials possess refractive indices very close to those of typical glass substrates, in contrast to titanium dioxide or titanium-substituted hydroxyapatite.

Stains on glass, particularly architectural glass, for example window glass in buildings, ships, and homes, are preferably removed before applying a surface treatment to the glass. The stains are often referred to as mineral or hard water stains. Compositions for removing mineral stains or hard water stains typically contain an abrasive and/or acid (see, for example, U.S. Pat. No. 3,425,870, U.S. Pat. No. 3,573,886 and U.S. Pat. No. 4,102,706). The acid present in some of these compositions includes mineral acids (such as hydrofluoric acid and hydrochloric acid) and/or organic acids.

SUMMARY

In a first aspect, the present invention is a heterocoagulate, comprising (a) first particles, having a particle size of at most 999 nm, comprising cerium oxide, on (b) a second particle, having a particle size of at least 3 microns, comprising at least one member selected from the group consisting of silicon oxides, aluminum oxides and zirconium oxides.

In a second aspect, the present invention is a polishing composition, comprising (1) a plurality of heterocoagulates, each heterocoagulate comprising (a) first particles, having a particle size of at most 999 nm, comprising cerium oxide, on (b) a second particle, having a particle size of at least 3 microns, comprising at least one member selected from the group consisting of silicon oxides, aluminum oxides and zirconium oxides. The polishing composition also comprises (2) water, and (3) an organic acid. The composition has a pH of at most 6.

In a third aspect, the present invention is a method of treating a surface of a substrate, comprising polishing the substrate with the polishing composition, to produce a polished surface of the substrate. A surface treatment composition may be applied on the polished surface, to produce a treated surface.

In a fourth aspect, the present invention is a kit, comprising the polishing composition, in a first container, and a surface treatment composition, in a second container.

DEFINITIONS

The term "heterocoagulate" means a composite structure of a plurality of first particles (typically nanopartices) on the surface of a second particle (typically a microparticle). The first particles are in contact with the second particle, and the first particles are present as individual particles (in addition, some of the first particles may also be present in small groups). An example of a heterocoagulate is shown in FIG. 1, where two first particles on two separate second particles, are identified as cerium oxide particles. This is in contrast to the composite particle shown in FIG. 2, where the first particles are only present in aggregates, one of which is identified as cerium oxide aggregate, therefore most first particles are not in contact with the second particle. Typically, in a heterocoagulate, the first particles are maintained on the surface of the second particle by electrostatic forces. In a heterocoagulate, aggregates of the first particles, containing at least 200 first particles, are preferably not present on the second particle.

The term "nanoparticle" means a particle having a particle size of at most 999 nm. Preferably, a nanoparticle has a particle size of 10 nm to 500 nm.

The term "microparticle" means a particle having a particle size of at least 1 micron (1000 nm). Preferably, a microparticle has a particle size of 2 microns to 500 microns.

The term "particle size" means the average diameter of the image of the particle as viewed by electron microscopy, unless otherwise stated. The term "average particle size" means the average of the particle sizes of a collection of particles.

The term "polishing" means rubbing the surface, for example "polishing the widow with a polishing composition" would be rubbing the surface of the window with a composition intended for rubbing a surface. The surface rubbed would be referred to the "polished surface", for example polishing a window will result in a polished surface of the window.

BRIEF DESCRIPTION OF THE DRAWINGS

FIG. 1 is an electron micrograph of a heterocoagulate of first particles of cerium oxide on a second particle of pumice.

FIG. 2 is an electron micrograph of a composite particle (not a heterocoagulate) of aggregated ceria particles on an alumina particle.

DETAILED DESCRIPTION

Providing a hydrophilic surface on glass, such as windows, improves the ability of ambient water, such as rain, to remove dirt or dust, creating a self-cleaning surface. A hydrophilic surface on glass may be created using a two-part treatment: first polishing the glass with a colloidal suspension of ceria, followed by treating the polished surface with a silica sol. Prior to creating this hydrophilic surface, it would be desirable to remove any stains, such as mineral stains. Many effective stain removal compositions contain an organic acid. In an effort to combine the first two of these three stages, (1) stain removal and (2) polishing, it was discovered that the colloidal suspensions of ceria flocculate in the presence of an organic acid, degrading the ability of the polishing composition to activate the surface of the glass. Without wishing to be bound by any particular theory, it is believed that the organic acids associate with the surfaces of the ceria particles thereby disrupting colloidal stability, which leads to agglomerate and aggregate formation. Furthermore, colloidal suspensions of ceria, without organic acid, do not efficiently remove mineral or hard water stains.

The present invention makes use of the discovery that ceria particles will form a heterocoagulate with particles of pumice (aluminum silicate). Surprisingly, the heterocoagulate is effective for polishing glass, similar to a dispersion of the ceria particles; however, the effectiveness of the heterocoagulate is not significantly altered when an organic acid is present. In the heterocoagulate, the ceria particles are present as individual particles on the surface of the second (pumice) particle (FIG. 1). In contrast, if a composite particle is formed which has only aggregated ceria particles on the surface of the second particle (FIG. 2), the composite particle is less effective for polishing the glass, compared to the heterocoagulate. When prepared as an aqueous polishing composition, which contains an organic acid, and the heterocoagulate of ceria particles and a pumice particle, the combination provides a single composition for both removing stains from glass, and polishing the glass. Polishing a substrate with the polishing composition can remove stains and activate the surface; treating the polished surface with a surface treatment, will then provide a treated surface, such as a hydrophilic surface if the surface treatment composition contains an appropriate silica sol.

A polishing composition contains a heterocoagulate, water, and an organic acid. The heterocoagulate is composed of smaller first particles containing a cerium oxide, such as nanoparticles of ceria, on a second particle containing a silicon oxide, an aluminum oxide, a zirconium oxide, or combinations thereof, such as a microparticle of pumice. Preferably, the composition is buffered, so that it maintains an acid pH, preferably a pH of 6 or less, during polishing. Optionally, the composition also contains a surfactant, a thickener, a solvent, a processing aid, fragrance, and/or colorants, and any permutation or combinations thereof.

The first particles contain a cerium oxide, such as ceria, mischmetal oxide, La/Ce oxides, as well as complex oxides of cerium and other metals, such as zirconium-cerium oxides and mixed zirconium-rare earth oxides containing cerium. Preferably, the first particles contain ceria. Preferably, the first particles are nanoparticles having a particle size of at most 999 nm, including a particle size of at most 100, 200 and 500 nm, more preferably a particle size of 10 nm to 500 nm, most preferably a particle size of 15 nm to 250 nm, such as 20, 30, 40, 50, 60, 70, 80, 90 and 100 nm. Preferably, the first particles have an average particle size of at most 999 nm, including an average particle size of at most 100, 200 and 500 nm, more preferably an average particle size of 10 nm to 500 nm, most preferably an average particle size of 15 nm to 250 nm, such as 20, 30, 40, 50, 60, 70, 80, 90 and 100 nm. Preferably, the first particles have a large zeta potential in water at a pH of 3-4, for example a zeta potential of 35-45 mV. An example of first particles are stoichiometric-nanostructured materials of cerium oxide prepared as described in Sarkas et al., U.S. Pat. No. 7,517,513, available from Nanophase Technologies Corporation, under the names NanoArc® Cerium Oxide nanopaticles, and CE-6040 dispersions (25% cerium oxide in water). Preferably, the first particles are present in an amount of 0.1 to 10% by weight, more preferably 1 to 8% by weight, such as 2 to 5% by weight, including 2.5, 3, 3.5, 4 and 4.5% by weight.

The second particle contains silicon oxide, aluminum oxide and/or zirconium oxide, as well as mixtures and combinations thereof. Examples of silicon oxides include silica, aluminosilicates (including amorphous aluminosilicate, crystalline aluminosilicates, and pumice) and other silicates. Examples of aluminum oxides include alumina, aluminosilicates (including amorphous aluminosilicate, crystalline aluminosilicates, and pumice) and magnesium aluminum oxides (for example, spinel). Examples of zirconium oxides include zirconia (for example, yttrium-stabilized cubic zirconia), zirconium-cerium oxide, aluminum-zirconium oxide, zirconium silicate (zircon) and mixed zirconium-rare earth oxides. Preferably, the second particle comprises an aluminosilicate, for example pumice. Preferably, the second particle is a microparticle having a particle size of at least 3 microns, for example a particle size of 3 to 500 microns, including a particle size of 3 to 250 microns, and a particle size of 10 to 100 microns, including 20, 30, 40, 50, 60, 70, 80 and 90 microns. The average particle size of the second particles in the composition may be 3 to 500 microns, 3 to 250 microns, or 10 to 100 microns, including an average particle size of 20, 30, 40, 50, 60, 70, 80 and 90 microns. Examples include second particles having an average particle size of 3 to 100 microns, with no particles having a particle size greater than 250 microns, or with no particles having a particle size greater than 100 microns. Examples include particles of grade F, FF, FFF, FFFF, −325/F, −200/F and corresponding FEPA grit. Preferably, the second particles are present in an amount of 10 to 70% by weight, more preferably 30 to 60% by weight, such as 35 to 45% by weight, including 36, 37, 38, 39, 40, 41, 42, 43 and 45% by weight.

When present together, particularly in water or an aqueous solution, the first particles and the second particle will preferably form a heterocoagulate. The first particles are preferably present as a dispersion, in water or an aqueous solution, when mixed with the second particle. Other ingredients of the polishing composition may be added before, during or after the first particles and the second particle are mixed together, however, the first particles should not be allowed to aggregate together before introducing the second particle, or a heterocoagulate may not form. This can usually be avoided by mixing the first particles and the second particle together before adding other ingredient, or quickly after adding other ingredients. The organic acid may cause the first particles to aggregate if mixed with a dispersion of the first particles, without quickly adding the second particle.

The organic acid may be chosen from any organic acid. Examples include acetic acid, citric acid, glycolic acid, gluconic acid, lactic acid, oxalic acid, sulfonic acid, tartaric acid, trifluoroacetic acid, acidic organic polymers, and mixtures thereof, preferably in combination, such as a combination of citric acid, glycolic acid, and oxalic acid, or oxalic acid, tartaric acid, and trifluoroacetic acid. The organic acid may be present with the corresponding conjugate base, to provide a buffer, which will resist changes in pH during polishing. Furthermore, a buffer, such as a phosphate buffer containing a phosphoric acid or any of its conjugate bases, may be added in addition to the organic acid. Other acids may also be added in addition to the organic acid, including other organic acids and one or more mineral acids (for example sulfuric acid, nitric acid, hydrochloric acid, hydrofluoric acid, and mixtures thereof). Preferably, the pH of the composition is less than 5, less than 4, less than 3, or less than 2, including a pH of 0.5 to 5, 1 to 4, or 3 to 4. Preferably, the organic acids are present in an amount of 1 to 25% by weight, more preferably 2 to 20% by weight, such as 3 to 15% by weight including 3, 4, 5, 6, 7, 8, 9, 10, 11, 12, 13 and 14%. When combinations of organic acids are used, each is preferably present in an amount of 1 to 4% by weight, including 1.5, 2, 2.5, 3 and 3.5% by weight.

Optionally, a surfactant is included in the polishing composition. One or more surfactants may be used, for example ionic surfactants such as alkyl sulfates (for example, sodium lauryl sulfate), alkyl ether sulfates (for example, sodium laureth sulfate) and alkyl benzene sulfonates (for example, dodecylbenzene sulfonic acid and sodium dodecylbenzene sulfonate), alkyl sulfosuccinates (for example sodium dioctyl sulfosuccinate); and non-ionic surfactants such as alcohol ethoxylates (for example, nonylphenol ethoxylates, octylphenol ethoxylates, secondary alcohol ethoxylates, and branched alcohol ethoxylates), alkyl polyglucosides, and ethylene oxide/propylene oxide copolymers; and mixtures thereof. Preferably, the surfactant is present in an amount of 0.1 to 10% by weight, more preferably 0.2 to 5% by weight, such as 0.3 to 3% by weight, including 0.4, 0.5, 0.6, 0.7, 0.8, 0.9, 1, 1.5, 2 and 2.5% by weight.

Optionally, a thickener is included in the polishing composition. One or more thickeners may be used, for example clays such as hectorite clays, garamite clays, organo-modified clays; saccharides and polysaccharides such as xanthan gum; celluloses and modified celluloses such as carboxymethyl cellulose, hydroxyethyl cellulose and hydroxypropyl cellulose; acrylate and (meth)acrylate polymers and copolymers; and modified ureas such as BYK® 420 (available from BYK Chemie). Examples include OPTIFLO® H400, H500, H600, HV80; Optigel® WX, CG, WH; Laponite® RD and Laponite® B, from Southern Clay Products. Other viscosity modifiers may be used, as well as particle addition to control viscosity, as described in Lewis et al., Patent Application Publication Pub. No. US 2003/0091647.

Optionally, a solvent is included in the polishing composition. One or more solvents may be used, for example methoxyethanol, ethoxyethanol, propoxyethanol and butoxyethanol; glycols and glycol ethers such as dipropylene glycol methyl ether and dipropylene glycol ethyl ether; pyrrolidones such as methylpyrrolidone and ethyl pyrrolidone. Preferably, the solvent is present in an amount of 0.1 to 20% by weight, more preferably 1 to 15% by weight, such as 2 to 10% by weight, including 3, 4, 5, 6, 7, 8, 9, 10, 11, 12, 13 and 14% by weight.

Optionally, a processing aid is included in the polishing composition, such as one or more defoamers. Typical defoamer compositions useful in the present invention include mixtures of polyethersiloxanes with organic polymers and fumed silica, modified polyether-polysiloxane copolymers and fumed silica, or molecular defoamers such as 3,5-dimethyl-1-hexyn-3-ol. Examples include TEGO® Foamex 800, 805, 808, 810, 815N, 822, 825, 830, 832, 835, 840, 842, 843, 855, 1488, 1495, 3062, 7447, 8030 and 8050, from Evonik. Optionally, one or more fragrances, and/or colorants or dyes may also be included in the polishing composition.

Surfactants, thickeners, solvents and processing aids should be selected to avoid interfering with the chemical and mechanical properties of the composition. Not wishing to be bound by any particular theory, it is thought that these agents may disrupt the chemical polishing action of the first particles of the heterocoagulate. This has been observed for selected defoamers, particularly acetylenic-modified, polysiloxane-based emulsion defoamers, selected thickeners, particularly inverse emulsion thickeners based on acrylamide copolymers, and with selected cellulosic and polysaccharide thickeners when used at excessive levels.

A water sheeting test may be used to identify those agents which may disrupt the chemical polishing action of the first particles. This water sheeting tests is performed by polishing the surface of a glass sheet, and then running water over the entire polished surface while observing the behavior of the water. If the water forms a continuous thin film that uniformly wets the surface, then the composition meets the water sheeting test and the agent or agents added do not disrupt the chemical polishing action. Pooling, where the water partially pulls away from the glass in isolated streams, or beading, where the water completely pulls away from the glass surface in isolated beads, indicates that the composition does not meet the water sheeting test, and disruption of the chemical polishing action may be occurring.

Optionally, a surface treatment composition is applied to the polished surface, to produce a treated surface. The surface treatment composition preferably contains water, nanoparticles with an average diameter below 100 nm, a surface wetting agent, a compound used for pH adjustment, and a pH indicator. Preferably, the nanoparticles contain silica or a synthetic hectorite clay, such as Laponite RD (Southern Clay Products, a particulate material having a tabular platelet structure with a typical diameter of 25 nm and a plate thickness of 1 nm). Such a surface treatment composition may be used to produce a hydrophilic surface. Other surface treatments may be used, for example surface treatments that provide a hydrophobic surface, a reflective surface and/or a scratch resistant surface.

A preferred surface treatment composition includes nanoparticles with an particle size of at most 100 nm, or at most 30 nm, for example a particle size of 5 to 100 nm, including a particles size of 10 to 50 nm, for example 11, 12, 15, 20, 25, 30, 35, 40 and 45 nm. Preferably, the nanoparticles have an average particle size of at most 100 nm, or at most 30 nm, for example an average particle size of 5 to 100 nm, including an average particles size of 10 to 50 nm, such as 11, 12, 15, 20, 25, 30, 35, 40 and 45 nm. Preferably, the nanoparticles are present in an amount of 0.1 to 2.0% by weight, more preferably 0.2 to 1.5% by weight, such as 0.3 to 1.0% by weight, including 0.4, 0.5, 0.6, 0.7, 0.8 and 0.9% by weight.

A preferred surface treatment composition includes one or more surface wetting agents, such as methanol, ethanol, isopropanol, and mixtures of alcohols. Optionally, a further wetting agent may be included, such as methoxyethanol, ethoxyethanol, propoxyethanol and butoxyethanol, as well as surfactants and dispersants, for example polyacids and/or silicones. The surface wetting agent may also be incorporated onto the nanoparticle through functionalization of the particle surface; for example, Bindzil® CC 30 supplied by Eka Chemical (an epoxy silane treated colloidal silica).

A preferred surface treatment composition includes one or more compounds used for pH adjustment, such as ammonia, alkyl amines, their salts, and may also include buffers or acids. A preferred surface treatment composition includes one or more pH indicators, such as phenolphthalein or thymolphthalein. A preferred pH of the preferred surface treatment composition is 10 to 11.

The polishing compositions of this disclosure may remove stains, especially mineral and hard water stains on windows. The polishing composition is also effective to activate a surface for subsequently forming a treated surface using a surface treatment composition. The polishing composition may also be effective to remove frosting on a window due to the use of a stain removing composition that etches glass, such as hydrofluoric acid, or to remove scratches or other surface defects that may be present on the window.

A variety of surface treatments may be used. For windows, a surface treatment composition that forms a hydrophilic surface is preferred.

EXAMPLES

Example 1

A polishing composition is described in the table below.

| Material | Supplier | Function |
| --- | --- | --- |
| CE-6040 | Nanophase Technologies | Nanoparticle Abrasive |
| Grade FFFF Pumice | Hess Pumice | Microparticle Base Abrasive |
| Glycolic Acid Solution 70 wt % Tech Solution | DuPont | Organic Acid |
| Citric Acid Powder Anhydrous USP | Jungbunzlauer | Organic Acid |
| Oxalic Acid Powder | Samirian | Organic Acid |
| Sodium Dodecyl Sulfate (Calfoam SLS-30 Solution (30 wt %)) | Pilot Chemical | Surfactant |
| Di (Propylene Glycol) Methyl Ether (Dowanol DPM) | Dow Chemical | Solvent |
| Defoamer[1] | 0.003 | Processing Aid |
| BYK ® 420 (BYK Chemie) | .02 | Thickener |
| Fragrance | 0.004 | Fragrance |
| Deionized water | 0.286 | Main Liquid Phase |

[1]TEGO ® Foamex 810 is a proprietary mixture of modified polyether-polysiloxane copolymer and fumed silica from Evonik.

Example 2

A polishing composition is described in the table below. This polishing composition polishes more slowly than the composition of Example 1.

| Material | Supplier | Function |
| --- | --- | --- |
| CE-6040 | Nanophase Technologies | Nanoparticle Abrasive |
| Celatom FW14 Diatomaceous Earth[1] | Eagle Picher Industies | Microparticle Base Abrasive |
| Glycolic Acid Solution 70 wt % Tech Solution | DuPont | Organic Acid |
| Citric Acid Powder Anhydrous DSP | Jungbunzlauer | Organic Acid |
| Oxalic Acid Powder | Samirian | Organic Acid |
| Sodium Dodecyl Sulfate (Calfoam SLS-30 Solution (30 wt %)) | Pilot Chemical | Surfactant |
| Di (Propylene Glycol) Methyl Ether (Dowanol DPM) | Dow Chemical | Solvent |
| Defoamer[2] | 0.003 | Processing Aid |
| BYK ® 420 | .02 | Thickener |
| Fragrance | 0.004 | Fragrance |
| Deionized water | 0.286 | Main Liquid Phase |

[1]Celatom FW14 Diatomaceous Earth is a silicate with a typical 90% silica assay having an average particle size of 8 μm.
[2]TEGO ® Foamex 810.

Example 3

Prophetic Example

A polishing composition is described in the table below.

| Material | Supplier | Function |
| --- | --- | --- |
| CE-6040 | Nanophase Technologies | Nanoparticle Abrasive |
| Duramul ZR 200/F[1] | Washington Mills Electrominerals | Microparticle Base Abrasive |
| Glycolic Acid Solution 70 wt % Tech Solution | DuPont | Organic Acid |
| Citric Acid Powder Anhydrous USP | Jungbunzlauer | Organic Acid |
| Oxalic Acid Powder | Samirian | Organic Acid |
| Sodium Dodecyl Sulfate (Calfoam SLS-30 Solution (30 wt %)) | Pilot Chemical | Surfactant |
| Di (Propylene Glycol) Methyl Ether (Dowanol DPM) | Dow Chemical | Solvent |
| Defoamer[2] | 0.003 | Processing Aid |
| BYK ® 420 | .02 | Thickener |
| Fragrance | 0.004 | Fragrance |
| Deionized water | 0.286 | Main Liquid Phase |

[1]Duramul ZR 200/F is a zirconia-mullite(aluminosilicate) grain produced by the electric furnace and ground to a particle size wherein the largest particle is 75 μm with a typical average particle size of 30-40 μm
[2]TEGO ® Foamex 810 is a defoamer consisting of a proprietary mixture of modified polyether-polysiloxane copolymer and fumed silica.

Example 4

A surface treatment composition, for producing a hydrophilic surface, is described in the table below:

| Material | Function | Nominal wt. fraction | Supplier |
| --- | --- | --- | --- |
| Bindzil ® CC 30 (29.0 wt % Solids)* | Silica Nanoparticle | 0.0167 | Eka Chemical |
| Deionized water | Solvent | 0.9757 | N/A |
| Aqua Ammonia | pH | 0.0076 | Hydrite |

-continued

| Material | Function | Nominal wt. fraction | Supplier |
|---|---|---|---|
| (19% solution) Phenolphthalein | Adjustment pH Indicator | 0.00004 | Aldrich Chemical |

*Bindzil ® CC 30 is a nominal 29 wt % suspension of epoxy silane functionalized amorphous silica nanoparticles having a base particle size of 7 nm.

Example 5

A surface treatment composition, for producing a hydrophilic surface, is described in the table below:

| Material | Function | Nominal wt. fraction | Supplier |
|---|---|---|---|
| Bindzil ® 830 (30.0 wt % Solids)[1] | Silica Nanoparticle | 0.02 | W. R. Grace |
| Deionized water | Solvent | 0.9222 | N/A |
| Aqua Ammonia (19% solution) | pH Adjustment | 0.0076 | Hydrite |
| TAMOL ® 1124[2] | Surface wetting agent | .00015 | Rohm & Haas |
| Butoxyethanol (99.8% Solution) | Surface wetting agent | 0.05 | Aldrich |
| Phenolphthalein | pH Indicator | 0.00004 | Aldrich Chemical |

[1]Ludox ® 830 is a nominal 30 wt % suspension of amorphous silica nanoparticles having a specific surface area of 200 m$^2$/g.
[2]Tamol ® 1124 is a hydrophilic copolymer dispersing agent.

Example 6

A surface treatment composition, for producing a hydrophilic surface, is described in the table below:

| Material | Function | Nominal wt. fraction | Supplier |
|---|---|---|---|
| Laponite ® RD* | Nanoparticle | 0.03 | Southern Clay Products |
| Deionized water | Solvent | 0.912 | N/A |
| Ethanol | Wetting Agent | .05 | ADM |
| Aqua Ammonia (19% solution) | pH Adjustment | 0.0076 | Hydrite |
| Phenolphthalein | pH Indicator | 0.00004 | Aldrich Chemical |

*Laponite ® RD is a synthetic hectorite nanoclay thickener. This material has a tabular platelet structure with a typical diameter of 25 nm and a plate thickness of 1 nm.

Immediately following polishing with the polishing composition, the surface is washed with clean water and allowed to dry. The surface treatment composition is then applied using a microfiber cloth to the polished surface, to prepare a hydrophilic surface.

Application is best achieved by rubbing the surface treatment composition on the polished surface in multiple passes and then making a single final pass to level the resultant liquid. The liquid is than allowed to dry for at least one hour to cure the treated surface.

A kit may also be provided, containing a polishing composition in a first container, and a surface treating composition, in a second container. Preferably, the first and second containers are supplied in a package, together.

What is claimed is:

1. A heterocoagulate, comprising a plurality of first particles on the surface of a second particle,
   wherein the particles comprise nanoparticles and a microparticle, and
   the particles comprise cerium oxide and aluminosilicate.

2. The heterocoagulate of claim 1, wherein the cerium oxide is selected from the group consisting of ceria, mischmetal oxide, La/Ce oxides, zirconium-cerium oxides, mixed zirconium-rare earth oxides containing cerium, and mixtures thereof.

3. The heterocoagulate of claim 1, wherein the cerium oxide is ceria.

4. The heterocoagulate of claim 1, wherein the first particles have a particle size of 15 nm to 250 nm.

5. The heterocoagulate of claim 1, wherein the first particles have an average particle size of 15 nm to 100 nm.

6. The heterocoagulate of claim 1, wherein the second particle has a particle size of 3 to 250 microns.

7. The heterocoagulate of claim 1, wherein the second particle has an particle size of 10 to 100 microns.

8. The heterocoagulate of claim 1, wherein the nanoparticles have a particle size of 10 to 100 nm, and
   the microparticle has a particle size of 1 micron to 100 microns.

9. An intermediate for preparing a polishing composition, comprising:
   (1) a plurality of heterocoagulates, each heterocoagulate comprising
      (a) first particles, having a particle size of at most 999 nm, on
      (b) a second particle, having a particle size of at least 1 micron, and
   (2) water,
   wherein the particles comprise cerium oxide and silicon oxide, and
   the second particles are present in an amount of 10 to 70% by weight.

10. The intermediate of claim 9, wherein the cerium oxide is ceria.

11. The intermediate of claim 9, wherein the first particles have an average particle size of 15 nm to 100 nm.

12. The intermediate of claim 9, wherein the second particles have a particle size of 3 to 250 microns.

13. The intermediate of claim 9, wherein the second particles have an average particle size of 3 to 100 microns, and
   none of the second particles have a particle size greater than 100 microns.

14. The intermediate of claim 9, wherein the first particles are present in an amount of 1 to 8% by weight.

15. The intermediate of claim 9, wherein the second particles are present in an amount of 30 to 60% by weight.

16. The intermediate of claim 9, wherein:
   the cerium oxide is ceria,
   the first particles have an average particle size of 15 nm to 100 nm,
   the second particles comprises an aluminosilicate,
   the second particles have an average particle size of 3 to 100 microns,
   none of the second particles have a particle size greater than 100 microns,
   the first particles are present in an amount of 1 to 8% by weight, and
   the second particles are present in an amount of 30 to 60% by weight.

17. A method of polishing a substrate, comprising polishing the substrate with a composition comprising a plurality of heterocoagulates, each heterocoagulate comprising
(a) first particles, having a particle size of at most 999 nm, on
(b) a second particle, having a particle size of at least 1 micron, wherein the particles comprise cerium oxide and silicon oxide, and the second particles are present in the composition in an amount of 10 to 70% by weight.

18. The method of claim 17, wherein the substrate is glass.

19. The method of claim 17, wherein the substrate is a glass window having a mineral stain or deposit.

20. A method of treating a surface of a substrate, comprising:
polishing the substrate by the method of claim 18, to produce a polished surface of the substrate; and
applying a surface treatment composition on the polished surface, to produce a treated surface.

21. The method of claim 20, wherein the treated surface is hydrophilic.

* * * * *